US008750078B2

(12) United States Patent
Inomata (10) Patent No.: US 8,750,078 B2
(45) Date of Patent: Jun. 10, 2014

(54) SLAVE DEVICE, TIME SYNCHRONIZATION METHOD IN SLAVE DEVICE, MASTER DEVICE, AND ELECTRONIC EQUIPMENT SYSTEM

(75) Inventor: Naoki Inomata, Kanagawa (JP)

(73) Assignee: Sony Corporation, Tokyo (JP)

( * ) Notice: Subject to any disclaimer, the term of this patent is extended or adjusted under 35 U.S.C. 154(b) by 686 days.

(21) Appl. No.: 12/693,761

(22) Filed: Jan. 26, 2010

(65) Prior Publication Data

US 2010/0209070 A1 Aug. 19, 2010

(30) Foreign Application Priority Data

Feb. 17, 2009 (JP) ................................. 2009-033553

(51) Int. Cl.
*H04J 1/02* (2006.01)
(52) U.S. Cl.
USPC ............................................ 368/46; 370/503
(58) Field of Classification Search
USPC ...................... 368/46–47; 370/503
See application file for complete search history.

(56) References Cited

U.S. PATENT DOCUMENTS

| 7,120,090 B2 * | 10/2006 | Smith | 368/10 |
| 2006/0126437 A1 * | 6/2006 | Smith | 368/46 |

| 2008/0304521 A1 * | 12/2008 | Del Prado Pavon et al. | 370/503 |
| 2010/0220748 A1 | 9/2010 | Inomata | |
| 2010/0254225 A1 * | 10/2010 | Schweitzer et al. | 368/47 |

FOREIGN PATENT DOCUMENTS

JP 2007-20183 1/2007

OTHER PUBLICATIONS

Inference—dictionary.com; Aug. 7, 2013.*
Infer—dictioanry.com; Aug. 7, 2013.*
Distinct—dictionary.com; Aug. 7, 2013.*
John C. Eidson et al., "IEEE-1588 Standard For A Precision Clock Synchronization Protocol For Networked Measurement and Control Systems", Proceedings of the 34th Annual Precise Time and Time Interval (PTTI) Systems and Applications Meeting, Dec. 3-5, 2002, 10 pages.

* cited by examiner

*Primary Examiner* — Sean Kayes
(74) *Attorney, Agent, or Firm* — Oblon, Spivak, McClelland, Maier & Neustadt, L.L.P.

(57) ABSTRACT

A slave device includes: a clock unit that outputs time information; a message receiving unit that receives messages sent from a master device; a message sending unit that sends messages to the master device; a calculation unit that calculates a correction value necessary for correcting the time on the clock unit; and a correction unit that corrects the time on the clock unit based on the correction value calculated by the calculation unit.

11 Claims, 6 Drawing Sheets

SLAVE DEVICE, TIME SYNCHRONIZATION METHOD IN SLAVE DEVICE, MASTER DEVICE, AND ELECTRONIC EQUIPMENT SYSTEM

BACKGROUND OF THE INVENTION

1. Field of the Invention

The present invention relates to a slave device, a time synchronization method in the slave device, a master device, and an electronic equipment system. More particularly, the present invention relates to slave devices enabling realization of time synchronization with a master device with high precision.

2. Description of the Related Art

In recent years, more and more media are digitalized, and many devices recording video streams in digital forms are commercialized as represented by video cameras. Moreover, with the digitalization of video streams, an environment has become widespread in which video streams can be edited easily.

An editing operation will be considered in which video streams captured with a plurality of video cameras are combined into a single video stream. This operation uses a method that correlates the video streams with the capturing times with reference to the timestamps of the video streams to switch between video data captured at the same time, thus constructing a single video stream in which video data are arranged in accordance with the capturing times.

For this to be successful, the internal clocks of all the video cameras used need be correctly synchronized to each other. In the related art, the IEEE 1588 protocol is known to be used for achieving time synchronization of the internal clocks of each electronic equipment in an electronic equipment system in which a plurality of video cameras, for example, is connected via Ethernet (registered trademark).

As is well known in the art, according to the IEEE 1588 protocol (see "Precision Clock Synchronization Protocol for Networked Measurement and Control System"), a slave device calculates and corrects a time difference (Offset) between a master device and the slave device and a path delay (Delay) including a latency between networks or devices, thus synchronizing the time on the slave device to the time on the master device.

Figure 5:
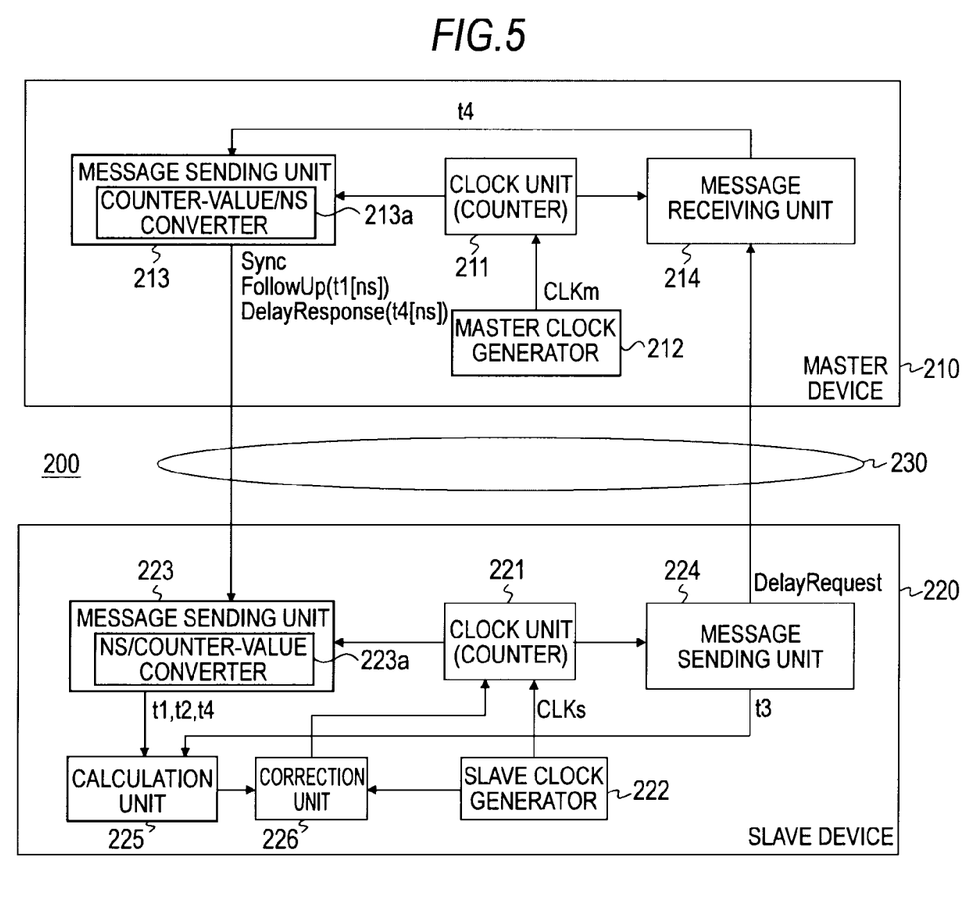
FIG. 5 is a schematic block diagram illustrating an exemplary configuration of an electronic equipment system in which time synchronization is achieved using the IEEE 1588 protocol.

FIG. 5 illustrates an exemplary configuration of an electronic equipment system 200 in which time synchronization is achieved using the IEEE 1588 protocol. The electronic equipment system 200 includes a master device 210 and a slave device 220. For example, when the electronic equipment system 200 is a camera system including a plurality of video cameras, the master device 210 is a video camera serving as a parent device, and the slave device 220 is a video camera serving as a child device. Furthermore, when the electronic equipment system 200 is a control system including a controlling device (computer) and a plurality of controlled devices, the master device 210 is the controlling device, and the slave device 220 is the controlled device.

For simplicity's sake, only one slave device 220 is illustrated in FIG. 5. In addition, only those portions related to time synchronization are illustrated in FIG. 5 as the configuration of the master device 210 and the slave device 220, and other portions are omitted.

The master device 210 includes a clock unit 211, a master clock generator 212, a message sending unit 213, and a message receiving unit 214.

The clock unit 211 is configured by a counter that is counted up with master clocks CLKm that are generated by the master clock generator 212. In the case of a video system such as a camera system, the frequency of the master clocks CLKm is 27 MHz, for example, which is typically used as a reference frequency for video transfer. The time information (counter value) that is output from the clock unit 211 is supplied to the message sending unit 213 and the message receiving unit 214.

The message sending unit 213 sends a PTP (Precision Time Protocol) message to the slave device 220 via a transmission line 230 such as Ethernet (registered trademark). Here, in order to include the time information in the PTP message, it is necessary to convert the counter value serving as the time information to a value in a nanosecond (ns) unit. For this purpose, the message sending unit 213 is provided with a counter-value/ns converter 213a that performs conversion from the counter value to the value in a nanosecond (ns) unit. The message receiving unit 214 receives a PTP message that is sent from the slave device 220 via the transmission line 230.

The PTP message that the message sending unit 213 sends to the slave device 220 includes a Sync message, a FollowUp message, and a DelayResponse message. The Sync message is sent to initiate a time synchronization operation. The FollowUp message is sent to convey the time information of the master device 210 after the Sync message is sent. The DelayResponse message is sent as a response to a later-described DelayRequest message after the message receiving unit 214 receives the DelayRequest message from the slave device 220.

The slave device 220 includes a clock unit 221, a slave clock generator 222, a message receiving unit 223, a message sending unit 224, a calculation unit 225, and a correction unit 226.

The clock unit 221 is configured by a counter that is counted up with slave clocks CLKs that are generated by the slave clock generator 222. In the case of a video system such as a camera system, the frequency of the slave clocks CLKs is 27 MHz, for example, similar to the frequency of the master clocks CLKm described above, which is typically used as a reference frequency for video transfer. The time information (counter value) that is output from the clock unit 221 is supplied to the message receiving unit 223 and the message sending unit 224.

The message receiving unit 223 receives the PTP message that is sent from the master device 210 via the transmission line 230. As described above, the time information contained in the PTP message that is sent from the master device 210 is information of a value in a nanosecond (ns) unit. For this purpose, the message receiving unit 223 is provided with an ns/counter-value converter 223a that performs conversion from the value in a nanosecond (ns) unit to the counter value. The message sending unit 224 sends a PTP message to the master device 210 via the transmission line 230.

The PTP message that the message sending unit 224 sends to the master device 210 includes a DelayRequest message. The DelayRequest message is sent to request the master device 210 to issue a DelayResponse message after the FollowUp message sent from the master device 210 is received by the message receiving unit 223.

The calculation unit 225 calculates a correction value necessary for correcting the time on the clock unit 221. Specifically, the calculation unit 225 calculates, as the correction value, an offset of the time St(x) on the clock unit 221 of the slave device 220 relative to the time Mt(x) on the clock unit 211 of the master device 210 by the following equation (1).

$$\text{Offset} = \{(t2-t1)-(t4-t3)\}/2 \qquad (1)$$

In the equation above, time t2 is the time at which the Sync message is received by the message receiving unit 223. Time t1 is the time represented by the time information of the FollowUp message that is received by the message receiving unit 223. Time t4 is the time represented by the time information of the DelayResponse message that is received by the message receiving unit 223. Finally, time t3 is the time at which the message sending unit 224 sent (issued) the DelayRequest message to the master device 210.

The correction unit 226 corrects the time on the clock unit 221 based on the offset which is the correction value calculated by the calculation unit 225. The time St(x) on the clock unit 221, which is not corrected, is in a state such that an offset is added to the time Mt(x) on the clock unit 211 of the master device 210. Therefore, the correction unit 226 corrects the time St(x) on the clock unit 221 at the timings synchronized to the slave clocks CLKs generated from the slave clock generator 222 so that the time St(x) has a value subtracted by the offset.

Figure 6:
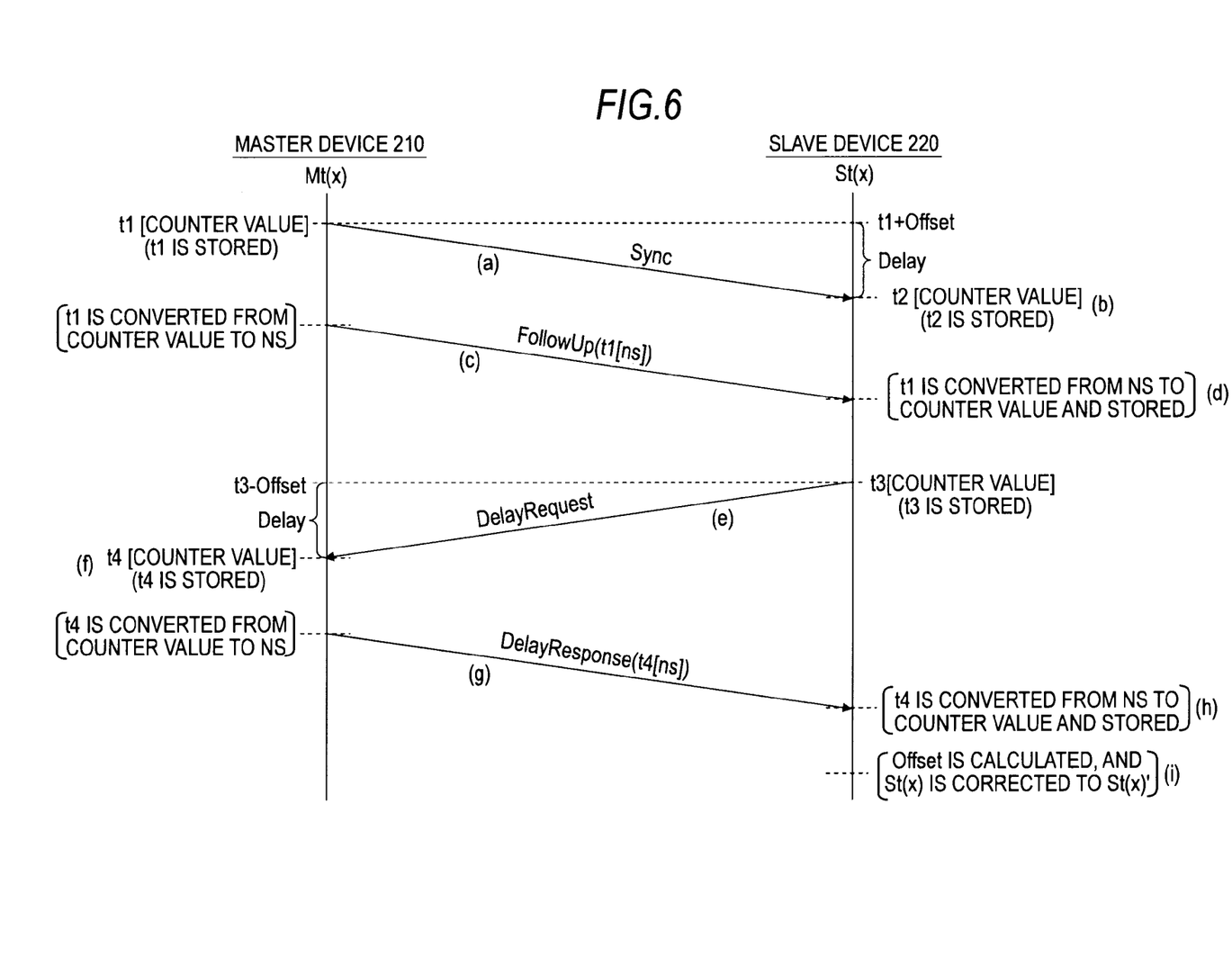
FIG. 6 is a sequence diagram illustrating a time synchronization operation which is performed in the electronic equipment system using the IEEE 1588 protocol.

FIG. 6 illustrates a sequence diagram of the time synchronization operation performed in the electronic equipment system 200 illustrated in FIG. 5.

(a) The time synchronization operation is initiated with the message sending unit 213 of the master device 210 sending a Sync message to the slave device 220. In this case, in the message sending unit 213, the issuance (sending) time t1 of the Sync message is stored in the form of the counter value which is the output of the clock unit 211.

(b) In the message receiving unit 223 of the slave device 220, the Sync message sent from the master device 210 is received, and the receipt time t2 of the Sync message is stored in the form of the counter value which is the output of the clock unit 221.

(c) Next, a FollowUp message is sent to the slave device 220 from the message sending unit 213 of the master device 210. The FollowUp message contains the time information representing the issuance time t1 of the Sync message in the form of a value in a nanosecond (ns) unit. In this case, the counter value representing the time t1 is converted to the value in a nanosecond (ns) unit by the counter-value/ns converter 213a of the message sending unit 213.

(d) In the message receiving unit 223 of the slave device 220, the FollowUp message sent from the master device 210 is received, and a value in a nanosecond (ns) unit representing the time t1 is acquired. Moreover, this value is converted to the counter value, which is the output of the clock unit 221 and represents the time t1, by the ns/counter-value converter 223a and the counter value stored in the message receiving unit 223.

(e) Next, a DelayRequest message is sent to the master device 210 from the message sending unit 224 of the slave device 220. In this case, in the message sending unit 224, the issuance (sending) time t3 of the DelayRequest message is stored in the form of the counter value which is the output of the clock unit 221.

(f) In the message receiving unit 214 of the master device 210, the DelayRequest message sent from the slave device 220 is received, and the receipt time t4 of the DelayRequest message is stored in the form of the counter value which is the output of the clock unit 211.

(g) Next, a DelayResponse message is sent to the slave device 220 from the message sending unit 213 of the master device 210. The DelayResponse message contains the time information representing the time t4 when the DelayRequest message is received by the message receiving unit 214 in the form of a value in a nanosecond (ns) unit. In this case, the counter value representing the time t4 is converted to a value in a nanosecond (ns) unit by the counter-value/ns converter 213a of the message sending unit 213.

(h) In the message receiving unit 223 of the slave device 220, the DelayResponse message sent from the master device 210 is received, and the value in a nanosecond (ns) unit representing the time t4 is acquired. Moreover, this value is converted to the counter value, which is the output of the clock unit 221 and represents the time t4, by the ns/counter-value converter 223a, and stored in the message receiving unit 223.

(i) Next, in the calculation unit 225 of the slave device 220, an offset serving as a correction value is calculated by the above-mentioned equation (1) using the counter values, which are stored in the message receiving unit 223 and represent the times t1, t2, and t4, and the counter value which is stored in the message sending unit 224 and represents the time t3. Moreover, the time St(x) on the clock unit 221 is corrected by the correction unit 226 so that the time St(x) has a value subtracted by the offset. In this way, the corrected time St(x)' on the clock unit 221 is in agreement with the time Mt(x) on the clock unit 211 of the master device 210, and synchronization is achieved.

SUMMARY OF THE INVENTION

According to the time synchronization operation described above, the calculation unit 225 of the slave device 220 calculates the offset of the time St(x) on the clock unit 221 of the slave device 220 relative to the time Mt(x) on the clock unit 211 of the master device 210 by the equation (1). In this case, since $\{(t2-t1)-(t4-t3)\}$ is divided by 2, the result of the offset calculation will typically contain an error of 0.5. Therefore, when the time on the clock unit 221 is corrected using the result of the offset calculation containing such an error, the slave device 220 will be unable to achieve time synchronization with the master device 210 with high precision.

It is therefore desirable to realize time synchronization between a master device and slave devices with high precision.

According to an embodiment of the present invention, there is provided a slave device including: a clock unit that outputs time information; a message receiving unit that receives messages sent from a master device; a message sending unit that sends messages to the master device; a calculation unit that calculates a correction value necessary for correcting the time on the clock unit; and a correction unit that corrects the time on the clock unit based on the correction value calculated by the calculation unit, wherein: the message receiving unit receives a first message that the master device issued at a first time and a second message that contains time information representing the first time and that the master device issued at a time later than the first time; the calculation unit calculates a first correction value by subtracting the first time represented by the time information which is contained in the second message received by the message receiving unit from a second time which is the time at which the first message is received by the message receiving unit; the correction unit performs a first stage of correction so that the time on the clock unit has a value subtracted by the first correction value calculated by the calculation unit; the message sending unit issues a third message to the master device at a third time after the first stage of correction is performed by the correction unit; the message receiving unit receives a fourth message that contains time information representing a fourth time at which the third message is received, the fourth message being issued after the third message is received by the master device; the calculation unit calculates a second correction value by subtracting the third time at which the third message is issued by the message sending unit from the fourth time represented by the time information which is contained in the fourth message received by the message receiving unit and dividing a subtraction result obtained thus by 2; and the correction unit performs a second stage of correction after the first stage of correction is performed so that the time on the clock unit has a value added by the second correction value calculated by the calculation unit.

In the embodiment of the present invention, the time on the clock unit of the slave device is corrected in two stages. In the first stage of correction, the first correction value is used which is calculated by subtracting the first time, at which a message is issued by the master device, from the second time at which the message is received. Then, the time on the clock unit of the slave device is corrected so that the time has a value subtracted by the first correction value. In this way, the corrected time on the clock unit of the slave device has a value corresponding to a subtraction of a transmission delay component (Delay) between the master device and the slave device from the time on the clock unit of the master device. Thus, the corrected time is in a state such that an offset component is excluded.

Moreover, in the second stage of correction, the second correction value is used which is calculated by subtracting the third time, at which a message is sent, from the fourth time, at which the message is received by the master device, and dividing a subtraction result obtained thus by 2. Then, the time on the clock unit of the slave device is corrected so that the time has a value subtracted by the second correction value. In this way, the time on the clock unit of the slave device is in agreement with the time on the master device, and thus time synchronization is achieved.

Therefore, in the embodiment of the present invention, the time on the clock unit of the slave device is not corrected using the result of the offset calculation containing such an error as in the case of the related art. For this reason, the slave device is able to achieve time synchronization with the master device with high precision.

In the embodiment of the present invention, the clock unit may be configured, for example, by a counter that is counted up with clocks of a predetermined frequency, and the time information which is contained in the second and fourth messages received by the message receiving unit may be a counter value.

In this manner, by sending the time information from the master device to the slave device in the form of the counter value, it is not necessary to perform the operation where the master device converts the counter value to a value in a nanosecond (ns) unit, for example, and the operation where the slave device converts the value in a nanosecond (ns) unit to the counter value. For this reason, the time information supplied from the master device to the slave device will be accurate time information containing no calculation errors during the conversion. Accordingly, the slave device is able to achieve time synchronization with the master device with higher precision.

According to the embodiment of the present invention, since the time on the clock unit of the slave device is not corrected using the result of the offset calculation containing such an error as in the case of the related art, the slave device is able to achieve time synchronization with the master device with high precision.

DESCRIPTION OF THE PREFERRED EMBODIMENTS

Hereinafter, modes (hereinafter referred to as embodiments) for carrying out the present invention will be described. The description will be given in the following order.

1. First Embodiment
2. Second Embodiment
3. Modified Embodiment

1. First Embodiment

Exemplary Configuration of Electronic Equipment System

Figure 1:
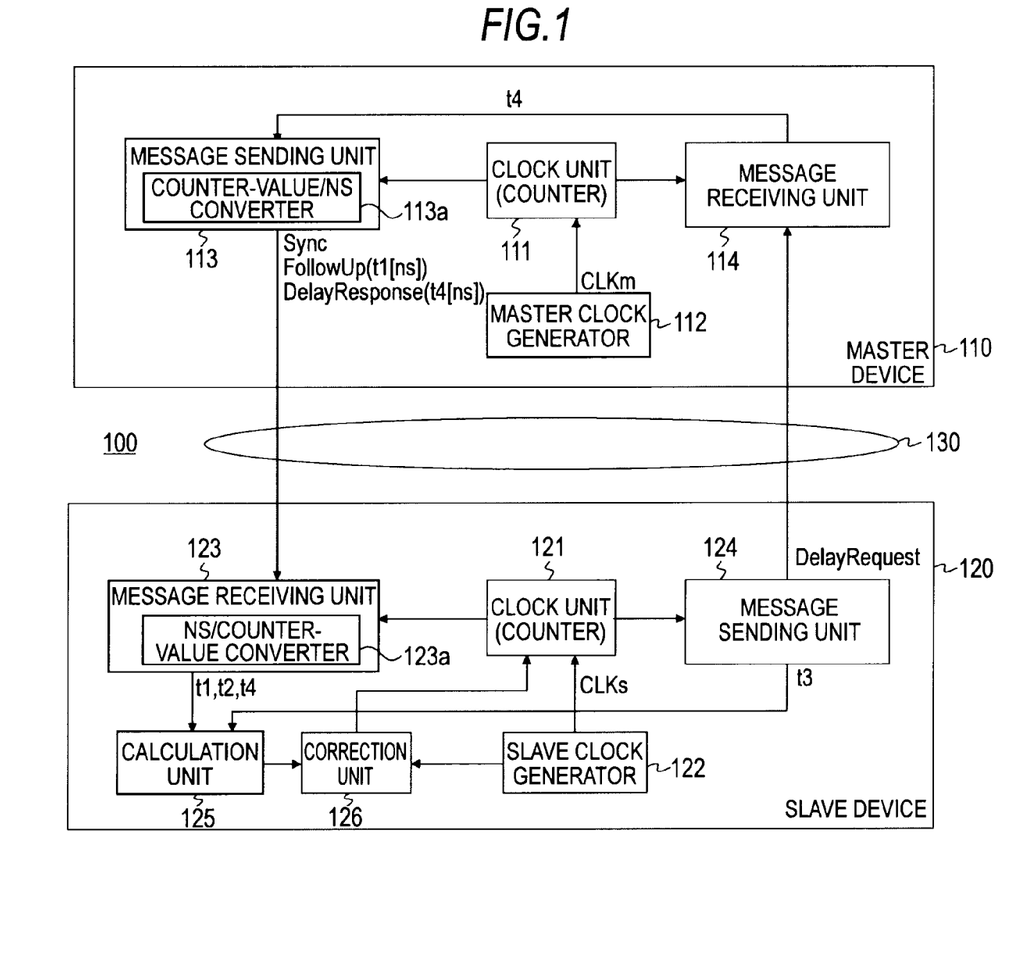
FIG. 1 is a schematic block diagram illustrating an exemplary configuration of an electronic equipment system according to a first embodiment of the present invention.

FIG. 1 illustrates an exemplary configuration of an electronic equipment system 100 according to the first embodiment. The electronic equipment system 100 includes a master device 110 and a slave device 120. For example, when the electronic equipment system 100 is a camera system including a plurality of video cameras, the master device 110 is a video camera serving as a parent device, and the slave device 120 is a video camera serving as a child device. Furthermore, when the electronic equipment system 100 is a control system including a controlling device (computer) and a plurality of controlled devices, the master device 110 is the controlling device, and the slave device 120 is the controlled device.

For the simplicity's sake, only one slave device 120 is illustrated in FIG. 1. In addition, only those portions related to time synchronization are illustrated in FIG. 1 as the configuration of the master device 110 and the slave device 120, and other portions are omitted.

The master device 110 includes a clock unit 111, a master clock generator 112, a message sending unit 113, and a message receiving unit 114.

The clock unit 111 is configured by a counter that is counted up with master clocks CLKm that are generated by the master clock generator 112. In the case of a video system such as a camera system, the frequency of the master clocks CLKm is 27 MHz, for example, which is typically used as a reference frequency for video transfer. The time information (counter value) that is output from the clock unit 111 is supplied to the message sending unit 113 and the message receiving unit 114.

The message sending unit 113 sends a PTP (Precision Time Protocol) message to the slave device 120 via a transmission line 130 such as Ethernet (registered trademark). Here, in order to include the time information in the PTP message, it is necessary to convert the counter value serving as the time information to a value in a nanosecond (ns) unit. For this purpose, the message sending unit 113 is provided with a counter-value/ns converter 113a that performs conversion from the counter value to the value in a nanosecond (ns) unit.

The message receiving unit 114 receives a PTP message that is sent from the slave device 120 via the transmission line 130.

The PTP message that the message sending unit 113 sends to the slave device 120 includes a Sync message, a FollowUp message, and a DelayResponse message. The Sync message is sent to initiate a time synchronization operation. The FollowUp message is sent to convey the time information of the master device 110 after the Sync message is sent. The DelayResponse message is sent as a response to a later-described DelayRequest message after the message receiving unit 114 receives the DelayRequest message from the slave device 120.

The slave device 120 includes a clock unit 121, a slave clock generator 122, a message receiving unit 123, a message sending unit 124, a calculation unit 125, and a correction unit 126.

The clock unit 121 is configured by a counter that is counted up with slave clocks CLKs that are generated by the slave clock generator 122. In the case of a video system such as a camera system, the frequency of the slave clocks CLKs is 27 MHz, for example, similar to the frequency of the master clocks CLKm described above, which is typically used as a reference frequency for video transfer. The time information (counter value) that is output from the clock unit 121 is supplied to the message receiving unit 123 and the message sending unit 124.

The message receiving unit 123 receives the PTP message that is sent from the master device 110 via the transmission line 130. As described above, the time information contained in the PTP message that is sent from the master device 110 is information of a value in a nanosecond (ns) unit. For this purpose, the message receiving unit 123 is provided with an ns/counter-value converter 123a that performs conversion from the value in a nanosecond (ns) unit to the counter value. The message sending unit 124 sends a PTP message to the master device 110 via the transmission line 130.

The PTP message that the message sending unit 124 sends to the master device 110 includes a DelayRequest message. The DelayRequest message is sent to request the master device 110 to issue a DelayResponse message after the FollowUp message sent from the master device 110 is received by the message receiving unit 123, and a first stage of correction described later is performed by the correction unit 126.

The calculation unit 125 calculates a correction value necessary for correcting the time on the clock unit 121. Specifically, the correction value includes a first correction value used in a first stage of correction and a second correction value used in a second stage of correction. The calculation unit 125 calculates (t2−t1) as the first correction value. Here, time t2 is the time at which the Sync message is received by the message receiving unit 123. Time t1 is the time represented by the time information of the FollowUp message that is received by the message receiving unit 123. Moreover, the calculation unit 125 calculates (t4−t3)/2 as the second correction value. Here, t4 is the time represented by the time information of the DelayResponse message that is received by the message receiving unit 123. Time t3 is the time at which the message sending unit 124 sent (issued) the DelayRequest message to the master device 110.

The correction unit 126 performs a first stage of correction and a second stage of correction. That is to say, in the first stage of correction, the correction unit 126 corrects the time St(x) on the clock unit 121 based on the first correction value calculated by the calculation unit 125. In this case, the correction unit 126 corrects the time St(x) on the clock unit 121 at the timings synchronized to the slave clocks CLKs generated from the slave clock generator 122 so that the time St(x) has a value subtracted by the first correction value "(t2−t1)".

In this case, the corrected time St(x)' on the clock unit 121 has a value corresponding to a subtraction of a transmission delay component (Delay) between the master device 110 and the slave device 120 from the time Mt(x) on the clock unit 111 of the master device 110. Thus, the corrected time St(x)' is in a state such that an offset component (Offset) is excluded.

That is to say, if it is assumed that a difference between the time St(x) on the clock unit 121 of the slave device 120, which is not corrected, and the time Mt(x) on the clock unit 111 of the master device 110 is Offset, then, the following equation (2) is satisfied.

$$St(x) - Mt(x) = \text{Offset} \tag{2}$$

When the equation (2) is modified, an equation (3) below is obtained.

$$St(x) = \text{Offset} + Mt(x) \tag{3}$$

If it is assumed that a transmission delay between the master device 110 and the slave device 120 is Delay, then the first correction value (t2−t1) can be expressed as an addition of Offset and Delay as given in the following equation (4).

$$(t2 - t1) = \text{Offset} + \text{Delay} \tag{4}$$

The first stage of correction can be expressed by the following equation (5).

$$St(x)' = St(x) - (t2 - t1) \tag{5}$$

When the above-mentioned equations (3) and (4) are substituted into this equation (5), the following equation (6) is obtained.

$$St(x)' = (\text{Offset} + Mt(x)) - (\text{Offset} + \text{Delay}) = Mt(x) - \text{Delay} \tag{6}$$

In this way, the corrected time St(x)' obtained in the first stage of correction has a value corresponding to a subtraction of a transmission delay component (Delay) between the master device 110 and the slave device 120 from the time Mt(x) on the clock unit 111 of the master device 110. Thus, the corrected time St(x)' is in a state such that an offset component (Offset) is excluded.

Moreover, in the second stage of correction, the correction unit 126 corrects the corrected time St(x)' on the clock unit 121 based on the second correction value calculated by the calculation unit 125. In this case, the correction unit 126 corrects the corrected time St(x)' on the clock unit 121 at the timings synchronized to the slave clocks CLKs generated from the slave clock generator 122 so that the corrected time St(x)' has a value added by the second correction value "(t4−t3)/2".

In this case, the corrected time St(x)" on the clock unit 121 is in agreement with the time Mt(x) on the clock unit 111 of the master device 110, and time synchronization with the master device 110 is achieved.

That is to say, from the above-mentioned equation (6), t4 is (Mt(x)+Delay) when t3 is (Mt(x)−Delay). Therefore, (t4−t3)/2 is the Delay as given in the following equation (7).

$$(t4 - t3)/2 = \{(Mt(x) + \text{Delay}) - (Mt(x) - \text{Delay})\}/2 \tag{7}$$

$$= 2 * \text{Delay}/2 = \text{Delay}$$

The second stage of correction can be expressed by the following equation (8).

$$St(x)'' = St(x)' + (t4 - t3)/2 \tag{8}$$

When the above-mentioned equations (6) and (7) are substituted into this equation (8), the following equation (9) is obtained.

$$St(x)''=(Mt(x)-\text{Delay})+\text{Delay}=Mt(x) \qquad (9)$$

In this way, the corrected time St(x)" obtained in the second stage of correction is in agreement with the time Mt(x) on the clock unit 111 of the master device 110, and time synchronization with the master device 110 is achieved.

Time Synchronization Operation

Figure 2:
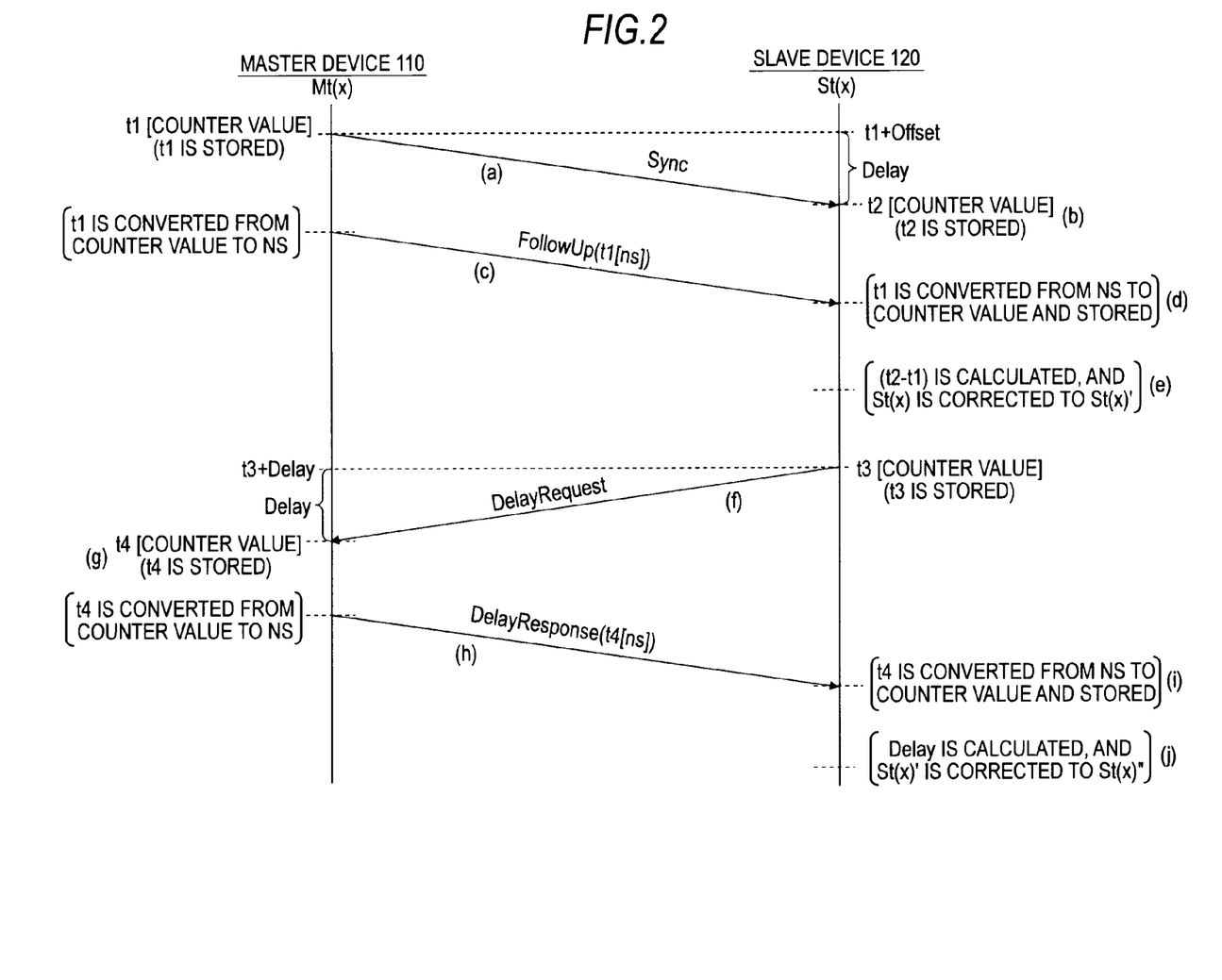
FIG. 2 is a sequence diagram illustrating a time synchronization operation performed in the electronic equipment system according to the first embodiment.

FIG. 2 illustrates a sequence diagram illustrating the time synchronization operation performed in the electronic equipment system 100 illustrated in FIG. 1.

(a) The time synchronization operation is initiated with the message sending unit 113 of the master device 110 sending a Sync message to the slave device 120. In this case, in the message sending unit 113, the issuance (sending) time t1 of the Sync message is stored in the form of the counter value which is the output of the clock unit 111.

(b) In the message receiving unit 123 of the slave device 120, the Sync message sent from the master device 110 is received, and the receipt time t2 of the Sync message is stored in the form of the counter value which is the output of the clock unit 121.

(c) Next, a FollowUp message is sent to the slave device 120 from the message sending unit 113 of the master device 110. The FollowUp message contains the time information representing the issuance time t1 of the Sync message as a value in a nanosecond (ns) unit. In this case, the counter value representing the time t1 is converted to the value in a nanosecond (ns) unit by the counter-value/ns converter 113a of the message sending unit 113.

(d) In the message receiving unit 123 of the slave device 120, the FollowUp message sent from the master device 110 is received, and a value in a nanosecond (ns) unit representing the time t1 is acquired. Moreover, this value is converted to the counter value, which is the output of the clock unit 121 and represents the time t1, by the ns/counter-value converter 123a, and the counter value is stored in the message receiving unit 123.

(e) Next, in the calculation unit 125 of the slave device 120, (t2−t1) serving as a first correction value is calculated using the counter values which are stored in the message receiving unit 123 and represent the times t1 and t2. Then, the time St(x) on the clock unit 121 is corrected by the correction unit 126 so that the time St(x) has a value subtracted by the first correction value "(t2−t1)" (see the equation (5)). The corrected time St(x)' on the clock unit 121 has a value corresponding to a subtraction of a transfer delay component (Delay) between the master device 110 and the slave device 120 from the time Mt(x) on the clock unit 111 of the master device 110. Thus, the corrected time St(x)' is in a state such that an offset component (Offset) is excluded (see the equation (6)).

(f) Next, a DelayRequest message is sent to the master device 110 from the message sending unit 124 of the slave device 120. In this case, in the message sending unit 124, the issuance (sending) time t3 of the DelayRequest message is stored in the form of the counter value which is the output of the clock unit 121.

(g) In the message receiving unit 114 of the master device 110, the DelayRequest message sent from the slave device 120 is received, and the receipt time t4 of the DelayRequest message is stored in the form of the counter value which is the output of the clock unit 111.

(h) Next, a DelayResponse message is sent to the slave device 120 from the message sending unit 113 of the master device 110. The DelayResponse message contains the time information representing the time t4 when the DelayRequest message is received by the message receiving unit 114 as a value in a nanosecond (ns) unit. In this case, the counter value representing the time t4 is converted to a value in a nanosecond (ns) unit by the counter-value/ns converter 113a of the message sending unit 113.

(i) In the message receiving unit 123 of the slave device 120, the DelayResponse message sent from the master device 110 is received, and the value in a nanosecond (ns) unit representing the time t4 is acquired. Moreover, this value is converted to the counter value, which is the output of the clock unit 121 and represents the time t4, by the ns/counter-value converter 123a, and the counter value is stored in the message receiving unit 123.

(j) Next, in the calculation unit 125 of the slave device 120, a second correction value "(t4−t3)/2" is calculated using the counter value, which is stored in the message receiving unit 123 and represents the time t4, and the counter value which is stored in the message sending unit 124 and represents the time t3. Moreover, the corrected time St(x)' on the clock unit 121 is corrected by the correction unit 126 so that the corrected time St(x)' has a value added by the second correction value "(t4−t3)/2" (see the equation (8)). In this way, the corrected time St(x)" on the clock unit 121 is in agreement with the time Mt(x) on the clock unit 111 of the master device 110 (see the equation (9)).

As described above, according to the time synchronization operation performed in the electronic equipment system 100 illustrated in FIG. 1, the time on the clock unit 121 of the slave device 120 is corrected in two stages.

In the first stage of correction, the first correction value "(t2−t1)" is used which is calculated by subtracting the first time t1, at which a message is issued by the master device 110, from the second time t2 at which the message is received. Then, the time St(x) on the clock unit 121 of the slave device 120 is corrected so that the time St(x) has a value subtracted by the first correction value. In this way, the corrected time St(x)' has a value corresponding to a subtraction of a transmission delay component (Delay) between the master device 110 and the slave device 120 from the time Mt(x) on the clock unit 111 of the master device 110. Thus, the corrected time St(x)' is in a state such that an offset component (Offset) is excluded.

Moreover, in the second stage of correction, the second correction value "(t4−t3)/2" is used which is calculated by subtracting the third time t3, at which a message is sent, from the fourth time t4, at which the message is received by the master device 110, and dividing a subtraction result obtained thus by 2. Then, the corrected time St(x)' on the clock unit 121 of the slave device 120 is corrected so that the corrected time St(x)' has a value added by the second correction value. In this way, the corrected time St(x)" on the clock unit 121 of the slave device 120 is in agreement with the time Mt(x) on the clock unit 111 of the master device 110, and thus time synchronization is achieved.

Therefore, in the electronic equipment system 100 illustrated in FIG. 1, the time on the clock unit 121 of the slave device 120 is not corrected using the result of the offset calculation containing such an error as in the case of the related art. For this reason, the slave device 120 is able to achieve time synchronization with the master device 110 with high precision.

2. Second Embodiment

Exemplary Configuration of Electronic Equipment System

Figure 3:
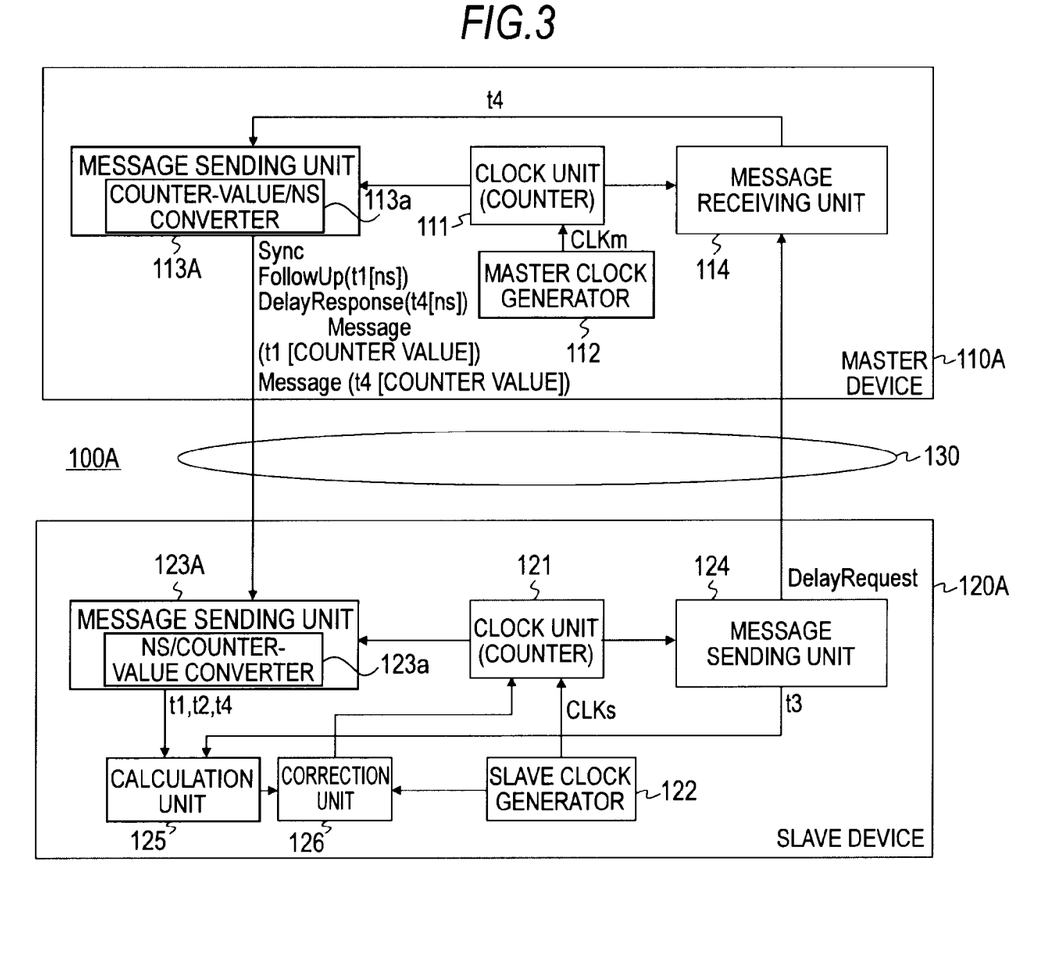
FIG. 3 is a schematic block diagram illustrating an exemplary configuration of an electronic equipment system according to a second embodiment of the present invention.

FIG. 3 illustrates an exemplary configuration of an electronic equipment system 100A according to the second embodiment. The electronic equipment system 100A includes a master device 110A and a slave device 120A similarly to the electronic equipment system 100 illustrated in FIG. 1. In FIG. 3, portions corresponding to those in FIG. 1 will be denoted by the same reference numerals, and description thereof will be omitted.

The master device 110A includes a clock unit 111, a master clock generator 112, a message sending unit 113A, and a message receiving unit 114.

The message sending unit 113A sends a PTP (Precision Time Protocol) message to the slave device 120 via a transmission line 130. The PTP message that the message sending unit 113A sends to the slave device 120 includes a Message message in addition to the above-described Sync message, FollowUp message, and DelayResponse message.

The message sending unit 113A sends the Message message subsequent to the FollowUp message to the slave device 120. As described above, the FollowUp message contains the time information representing the time t1, at which the Sync message is issued (sent), as a value in a nanosecond (ns) unit. The Message message subsequent to the FollowUp message also contains the time information representing the time t1, but the time information is in the form of a counter value representing the time t1.

Moreover, the message sending unit 113A sends a Message message subsequent to the DelayResponse message to the slave device 120. As described above, the DelayResponse message contains the time information representing the time t4 when the DelayRequest message is received by the message receiving unit 114 as a value in a nanosecond (ns) unit. The Message message subsequent to the DelayResponse message also contains the time information representing the time t4, but the time information is in the form of a counter value representing the time t4.

Other configurations of the master device 110A are the same as those of the master device 110 of the electronic equipment system 100 illustrated in FIG. 1.

The slave device 120A includes a clock unit 121, a slave clock generator 122, a message receiving unit 123A, a message sending unit 124, a calculation unit 125, and a correction unit 126.

The frequency of the slave clocks CLKs generated by the slave clock generator 122 is the same as the frequency of the master clocks CLKm generated by the master clock generator 112 of the master device 110A described above. For example, in the case of a video system such as a camera system, the frequencies of both clocks CLKm and CLKs are 27 MHz, for example, which is typically used as a reference frequency for video transfer.

The message receiving unit 123A receives the PTP message that is sent from the master device 110A via the transmission line 130. As described above, the Message message is sent, subsequently to the FollowUp message, from the message sending unit 113A of the master device 110A. The message receiving unit 123A receives the FollowUp message and the Message message which is sent subsequently thereto.

The FollowUp message contains the value in a nanosecond (ns) unit as the time information representing the time t1. On the other hand, the Message message contains the counter value as the time information representing the time t1. In this embodiment, the message receiving unit 123A acquires and stores the counter value which is contained in the Message message and represents the time t1. The calculation unit 125 uses this time t1 [counter value] when calculating a first correction value "(t2−t1)".

Moreover, as described above, the Message message is sent, subsequently to the DelayResponse message, from the message sending unit 113A of the master device 110A. The message receiving unit 123A receives the DelayResponse message and the Message message which is sent subsequently thereto.

The DelayResponse message contains the value in a nanosecond (ns) unit as the time information representing the time t4. On the other hand, the Message message contains the counter value as the time information representing the time t4. In this embodiment, the message receiving unit 123A acquires and stores the counter value which is contained in the Message message and represents the time t4. The calculation unit 125 uses this time t4 [counter value] when calculating a second correction value "(t4−t3)/2".

Other configurations of the slave device 120A are the same as those of the slave device 120 of the electronic equipment system 100 illustrated in FIG. 1.

Time Synchronization Operation

Figure 4:
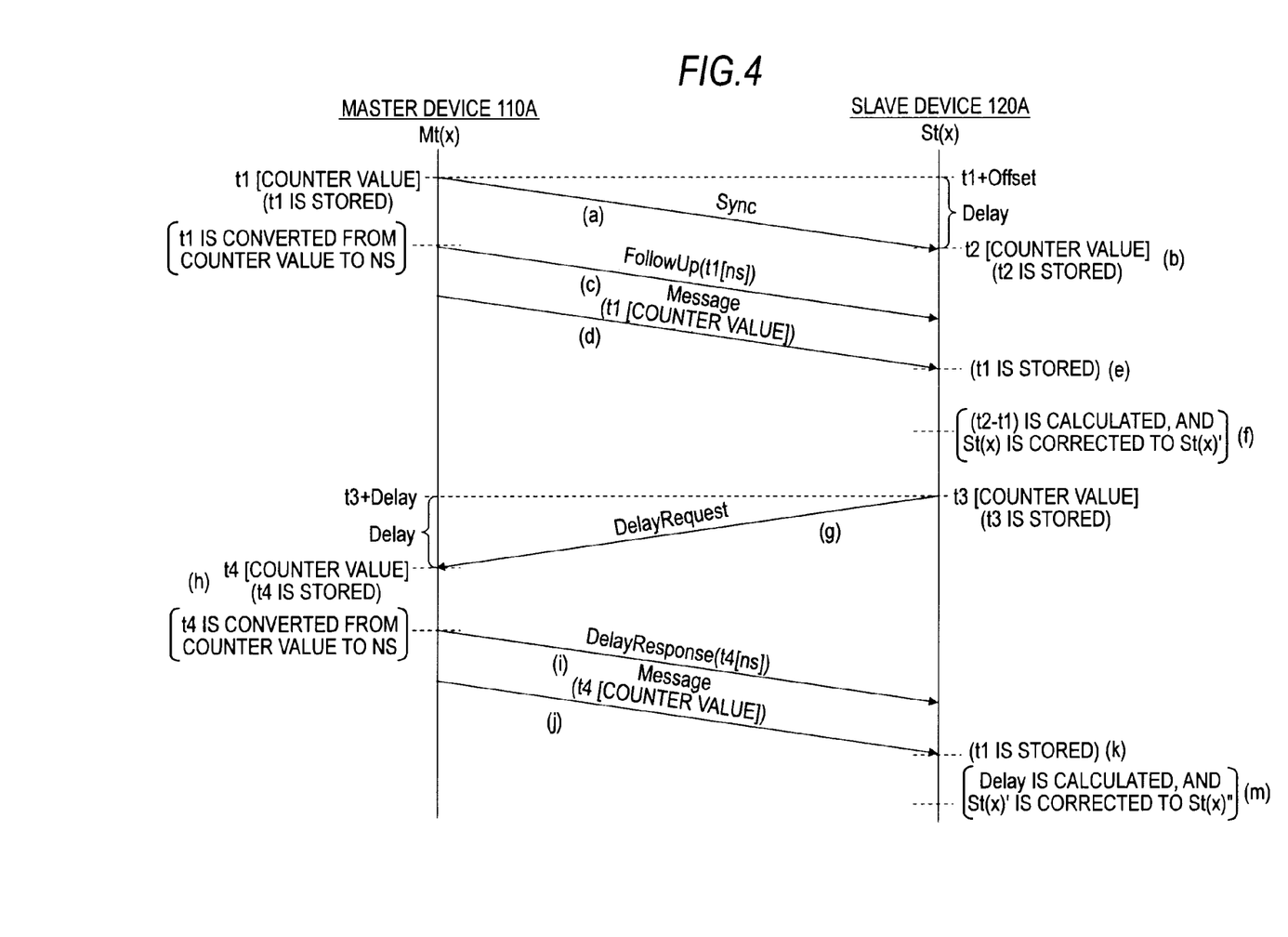
FIG. 4 is a sequence diagram illustrating a time synchronization operation performed in the electronic equipment system according to the second embodiment.

FIG. 4 illustrates a sequence diagram illustrating the time synchronization operation performed in the electronic equipment system 100A illustrated in FIG. 3.

(a) The time synchronization operation is initiated with the message sending unit 113A of the master device 110A sending a Sync message to the slave device 120A. In this case, in the message sending unit 113A, the issuance (sending) time t1 of the Sync message is stored in the form of the counter value which is the output of the clock unit 111.

(b) In the message receiving unit 123A of the slave device 120A, the Sync message sent from the master device 110A is received, and the receipt time t2 of the Sync message is stored in the form of the counter value which is the output of the clock unit 121.

(c) Next, a FollowUp message is sent to the slave device 120A from the message sending unit 113A of the master device 110A. The FollowUp message contains the time information representing the issuance time t1 of the Sync message as a value in a nanosecond (ns) unit. In this case, the counter value representing the time t1 is converted to the value in a nanosecond (ns) unit by the counter-value/ns converter 113a of the message sending unit 113A.

In the message receiving unit 123A of the slave device 120A, the FollowUp message sent from the master device 110A is received. However, in the message receiving unit 123A of this embodiment, the operation of acquiring the value in nanosecond (ns) unit representing the time t1, converting the value to the counter value, and storing the counter value is not performed.

(d) Next, a Message message is sent to the slave device 120A from the message sending unit 113A of the master device 110A. The Message message contains the time information representing the issuance time t1 of the Sync message as the counter value.

(e) In the message receiving unit 123A of the slave device 120A, the Message message sent from the master device 110A is received, and the counter value representing the time t1 is acquired and stored as it was.

(f) Next, in the calculation unit 125 of the slave device 120A, (t2−t1) serving as a first correction value is calculated using the counter values which are stored in the message receiving unit 123A and represent the times t1 and t2. Then, the time St(x) on the clock unit 121 is corrected by the correction unit 126 so that the time St(x) has a value subtracted by the first correction value "(t2−t1)" (see the equation (5)). The corrected time St(x)' on the clock unit 121 has a value corresponding to a subtraction of a transfer delay component (Delay) between the master device 110A and the slave device 120A from the time Mt(x) on the clock unit 111 of the master device 110A. Thus, the corrected time St(x)' is in a state such that an offset component (Offset) is excluded (see the equation (6)).

(g) Next, a DelayRequest message is sent to the master device 110A from the message sending unit 124 of the slave device 120A. In this case, in the message sending unit 124, the issuance (sending) time t3 of the DelayRequest message is stored in the form of the counter value which is the output of the clock unit 121.

(h) In the message receiving unit 114 of the master device 110A, the DelayRequest message sent from the slave device 120A is received, and the receipt time t4 of the DelayRequest message is stored in the form of the counter value which is the output of the clock unit 111.

(i) Next, a DelayResponse message is sent to the slave device 120A from the message sending unit 113A of the master device 110A. The DelayResponse message contains the time information representing the time t4 when the DelayRequest message is received by the message receiving unit 114 as a value in a nanosecond (ns) unit. In this case, the counter value representing the time t4 is converted to a value in a nanosecond (ns) unit by the counter-value/ns converter 113a of the message sending unit 113A.

In the message receiving unit 123A of the slave device 120A, the DelayResponse message sent from the master device 110A is received. However, in the message receiving unit 123A of this embodiment, the operation of acquiring the value in nanosecond (ns) unit representing the time t4, converting the value to the counter value, and storing the counter value is not performed.

(j) Next, a Message message is sent to the slave device 120A from the message sending unit 113A of the master device 110A. The Message message contains the time information representing the time t4, at which the DelayRequest message is received by the message receiving unit 114, as the counter value.

(k) In the message receiving unit 123A of the slave device 120A, the Message message sent from the master device 110A is received, and the counter value representing the time t4 is acquired and stored as it was.

(m) Next, in the calculation unit 125 of the slave device 120A, a second correction value "(t4−t3)/2" is calculated using the counter value of the time t4, which is stored in the message receiving unit 123A, and the counter value of the time t3, which is stored in the message sending unit 124. Moreover, the corrected time St(x)' on the clock unit 121 is corrected by the correction unit 126 so that the corrected time St(x)' has a value added by the second correction value "(t4−t3)/2" (see the equation (8)). In this way, the corrected time St(x)" on the clock unit 121 is in agreement with the time Mt(x) on the clock unit 111 of the master device 110A (see the equation (9)).

As described above, according to the time synchronization operation performed in the electronic equipment system 100A illustrated in FIG. 3, the time on the clock unit 121 of the slave device 120A is corrected in two stages, similarly to the electronic equipment system 100 illustrated in FIG. 1. Therefore, in the electronic equipment system 100A illustrated in FIG. 3, the time on the clock unit 121 of the slave device 120A is not corrected using the result of the offset calculation containing such an error as in the case of the related art. For this reason, the slave device 120A is able to achieve time synchronization with the master device 110A with high precision.

Moreover, in the electronic equipment system 100A illustrated in FIG. 3, the Message message is sent from the master device 110A to the slave device 120A, in which the time information of the times t1 and t4 is conveyed in the form of the counter value. In this manner, by sending the time information from the master device 110A to the slave device 120A in the form of the counter value, it is not necessary for the time information to be subjected to the operation where the master device converts the counter value to the value in a nanosecond (ns) unit, for example, and the operation where the slave device converts the value in a nanosecond (ns) unit to the counter value. For this reason, the time information of the times t1 and t4 supplied from the master device 110A to the slave device 120A will be accurate time information containing no calculation errors during the conversion. Therefore, the calculation unit 125 is able to calculate the first correction value "(t2−t1)" and the second correction value "(t4−t3)/2" with high precision. Accordingly, the slave device 120A is able to achieve time synchronization with the master device 110A with higher precision.

3. Modified Embodiment

In the embodiments described above, the PTP message is used as the message exchanged between the master device 110 or 110A and the slave device 120 or 120A; however, the present invention is not limited to this.

Moreover, in the embodiments described above, the calculation unit 125 and the correction unit 126 are separately provided in the slave device 120 or 120A, however, the block configuration of the slave device 120 or 120A is not limited to this. For example, the calculation unit 125 and the correction unit 126 may be configured as one processing block.

The embodiment of the present invention enables realization of time synchronization between slave devices and a master device with high precision. Therefore, the present invention can be applied to a camera system requiring time synchronization among a plurality of video cameras, a control system requiring time synchronization between a controlling device and controlled devices, and other systems requiring such time synchronization.

The present application contains subject matter related to that disclosed in Japanese Priority Patent Application JP 2009-033553 filed in the Japan Patent Office on Feb. 17, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A slave device used in a system including a master device and the slave device, the slave device comprising:
circuitry configured to:
output time information;
receive messages issued from the master device;
issue messages to the master device;
calculate a correction value necessary to correct the output time information; and
correct the output time information based on the calculated correction value, wherein
the circuitry is further configured to:
receive a first message that the master device issued at a first time and a second message that contains time information representing the first time and that the master device issued at a time later than the first time;
calculate a first correction value by subtracting the first time represented by the time information which is contained in the second message from a second time which is the time at which the first message is received;

perform a first stage of correction so that the output time information has a value subtracted by the calculated first correction value;

issue a third message to the master device at a third time after the first stage of correction is performed;

receive a fourth message that contains time information representing a fourth time at which the third message is received, the fourth message issued by the master device;

calculate a second correction value by subtracting the third time at which the third message is issued from the fourth time represented by the time information which is contained in the fourth message and dividing a subtraction result obtained thus by 2;

perform a second stage of correction after the first stage of correction is performed so that the output time information has a value added by the calculated second correction value; and increment the output time information by utilizing a counter that is counted up with clocks of a predetermined frequency, and wherein the time information which is contained in the second and fourth messages is a counter value that has not been converted into a unit of seconds.

2. The slave device according to claim 1, wherein the system is a camera system including a plurality of video cameras, and the master device and the slave device are video cameras.

3. The slave device according to claim 1, wherein the circuitry is further configured to issue and receive messages using a precision time protocol.

4. A time synchronization method in a slave device used in a system including a master device and the slave device, the method comprising:

receiving a first message that the master device issued at a first time;

receiving a second message that contains time information representing the first time and that the master device issued at a time later than the first time;

calculating a first correction value by subtracting the first time represented by the time information which is contained in the second message received from a second time which is the time at which the first message is received;

performing a first stage of correction so that the time on a clock has a value subtracted by the first correction value;

issuing a third message to the master device at a third time after the first stage of correction is performed;

receiving a fourth message that contains time information representing a fourth time at which the third message is received;

calculating a second correction value by subtracting the third time at which the third message is issued from the fourth time represented by the time information which is contained in the fourth message received and dividing a subtraction result obtained thus by 2; and performing a second stage of correction so that the time on the clock has a value added by the second correction value, wherein the clock is configured to increment the output information time by utilizing a counter that is counted up with clocks of a predetermined frequency, and the time information which is contained in the second and fourth messages received is a counter value that has not been converted into a unit of seconds.

5. The time synchronization method according to claim 4, wherein messages are issued and received using a precision time protocol.

6. An electronic equipment system comprising:
a master device; and
a slave device, wherein
the master device includes:
 circuitry configured to:
 output time information;
 issue messages to the slave device and
 receive messages issued from the slave device, wherein
 the circuitry is further configured to:
 issue a first message to the slave device at a first time and issue a second message containing time information representing the first time to the slave device at a time later than the first time;
 receive a third message that the slave device issued at a third time; and
 issue a fourth message containing time information representing a fourth time, at which the third message is received, to the slave device, and
the slave device includes:
 circuitry configured to:
 output time information;
 receive messages issued from the master device;
 issue messages to the master device;
 calculate a correction value necessary to correct the output time information; and
 correct the output time information based on the calculated correction value, wherein
 the circuitry is further configured to:
 receive a first message that the master device issued at a first time and a second message that contains time information representing the first time and that the master device issued at a time later than the first time;
 calculate a first correction value by subtracting the first time represented by the time information which is contained in the second message from a second time which is the time at which the first message is received;
 perform a first stage of correction so that the output time information has a value subtracted by the calculated first correction value;
 issue a third message to the master device at a third time after the first stage of correction is performed;
 receive a fourth message that contains time information representing a fourth time at which the third message is received, the fourth message issued by the master device;
 calculate a second correction value by subtracting the third time at which the third message is issued from the fourth time represented by the time information which is contained in the fourth message and dividing a subtraction result obtained thus by 2;
 perform a second stage of correction after the first stage of correction is performed so that the output time information has a value added by the calculated second correction value; and
 increment the output time information by utilizing a counter that is counted up with clocks of a predetermined frequency, and
 the time information which is contained in the second and fourth messages is a counter value that has not been converted into a unit of seconds.

7. The electronic equipment system according to claim 6, wherein the electronic equipment system is a camera system including a plurality of video cameras, and the master device and the slave device are video cameras.

8. The electronic equipment system according to claim 6, wherein the circuitry of the master device is further configured to issue and receive messages using a precision time protocol, and the circuitry of the slave device is further configured to issue and receive messages using the precision time protocol.

9. A master device used in a system including the master device and a slave device, the master device comprising:

circuitry configured to:

count up a counter with clocks of a predetermined frequency to increment a counter value;

output time information that represents the counter value;

issue messages to slave device; and receive messages issued from the slave device wherein the circuitry is further configured to:

issue a first message to the slave device at a first time and issue a second message containing the counter value at the first time to the slave device at a time later than the first time;

receive a third message from the slave device issued at a third time;

issue a fourth message containing the counter value at a fourth time at which the third message is received by the slave device; and the time information which is contained in the second and fourth messages is a counter value that has not been converted into a unit of seconds.

10. The master device according to claim 9, wherein the system is a camera system including a plurality of video cameras, and the master device and the slave device are video cameras.

11. The master device according to claim 9, wherein the circuitry is further configured to issue and receive messages using a precision time protocol.

* * * * *